(12) United States Patent
Nagino et al.

(10) Patent No.: US 6,265,499 B1
(45) Date of Patent: Jul. 24, 2001

(54) PROCESS FOR PRODUCING A SHAPED PRODUCT WITH A RADICAL SCAVENGER, POLYMERIZATION INITIATOR AND A RADICAL POLYMERIZABLE MONOMER

(75) Inventors: Haruko Nagino; Ichiro Ando, both of Kasugai (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 09/200,467

(22) Filed: Nov. 27, 1998

(30) Foreign Application Priority Data

Dec. 3, 1997 (JP) .................................................... 9-333155

(51) Int. Cl.⁷ ...................................................... C08F 2/00
(52) U.S. Cl. ............................ 526/65; 526/206; 526/220; 526/245; 526/251; 526/279; 526/303.1; 526/320; 526/328; 526/329.7; 526/330
(58) Field of Search ............................... 526/65, 206, 220

(56) References Cited

U.S. PATENT DOCUMENTS 5,401,804 * 3/1995 Georges ................................ 525/267

FOREIGN PATENT DOCUMENTS 0 609 454    8/1994    (EP) .
2 306 963    5/1997    (GB) .

* cited by examiner

*Primary Examiner*—Bernard Lipman
(74) *Attorney, Agent, or Firm*—Oblon, Spivak, McClelland, Maier & Neustadt, P.C.

(57) ABSTRACT

A process for producing a shaped product, which comprises polymerizing a mixture comprising a radical scavenger, a polymerization initiator and a radical polymerizable monomer to obtain a partially polymerized mixture having the conversion of the monomer into the polymer of from 5 to 90 wt %, filling the partially polymerized mixture in a predetermined cavity and then applying polymerization energy to complete polymerization.

19 Claims, No Drawings

PROCESS FOR PRODUCING A SHAPED PRODUCT WITH A RADICAL SCAVENGER, POLYMERIZATION INITIATOR AND A RADICAL POLYMERIZABLE MONOMER

BACKGROUND OF THE INVENTION

1. Field of the Invention

The present invention relates to a process for producing a shaped product. More particularly, it relates to a process for producing a shaped product, which is useful for the production of molded products, for example, three-dimensional shaped products having specific shapes including ocular lenses such as contact lenses or intraocular lenses, camera lenses, pickup lenses for compact discs (CDs) or lenses for spectacles, or for the production of compound products such as bone cement for substitution of artificial hip joints.

2. Discussion of the Background

Heretofore, ocular lenses such as contact lenses or intraocular lenses, have been produced by a so-called mold polymerization method wherein a monomer is charged into a mold and polymerized in the mold by using azobisisobutyronitrile or a peroxide as a polymerization initiator.

However, when such a mold polymerization method is employed, there is a drawback that polymerization shrinkage occurs as the polymerization of the monomer progresses in the mold, whereby it is difficult to prepare a molded product corresponding precisely to the shape of the mold.

Further, a technique so-called "Stereo Lightgraphy", has recently been employed in which a polymer is laminated by photopolymerization to obtain a three-dimensional shaped product. In such a method, it is common in many cases to employ an epoxy resin which is less susceptible to polymerization shrinkage. However, if a resin susceptible to polymerization shrinkage, such as an acryl monomer, is used, dimensional precision of the shaped product tends to be low, and it tends to be difficult to obtain a shaped product having a desired shape. Thus, this technique has a problem that the types of useful resins are substantially limited.

As is apparent from the above examples, it is important to reduce polymerization shrinkage in many fields where polymerization curing of a monomer is utilized.

It is usually considered that polymerization shrinkage occurs at the time of polymerization of a monomer, because the van der Waals distance among the monomer molecules changes to a covalent bond distance by the polymerization. Accordingly, the smaller the amount of the monomer involved in the polymerization, the less the polymerization shrinkage. In a case where polymerization is resumed from a partially polymerized state, the degree of polymerization shrinkage decreases to a level corresponding to the amount of the remaining monomer. For example, in radical bulk polymerization of methyl methacrylate, it is known that when polymerization is carried out from the monomer, the polymerization shrinkage will be about 21%. In a case where a mixture partially polymerized to a level of 50%, is further polymerized, the polymerization shrinkage will be reduced to a level of 10%.

Paying an attention to such a point, it has been proposed to fill a partially polymerized material in a predetermined mold or cavity and to polymerize it again to reduce the polymerization shrinkage.

In such a proposal, it has been common to use, as a polymerization initiator, an azo compound such as azobisisobutyronitrile, a thermal polymerization initiator such as a peroxide compound such as benzoyl peroxide, or a photopolymerization initiator such as benzophenone, benzil or a benzoin compound. In the polymerization with these polymerization initiators, once active free radicals are dissociated from the polymerization initiator, they immediately attach to the monomer, and the polymer chains will continue to grow, unless deactivation due to a chain transfer or termination reaction takes place during the polymerization. Accordingly, once polymerization is initiated, it is not possible to terminate the polymerization unless the growing species are deactivated. Once growing species are deactivated, the polymerization ability will not be regained. Such a characteristic makes it difficult to obtain a partially polymerized mixture in a desired state quantitatively. For example, it is difficult to completely terminate polymerization even if the material wherein the polymerization is once initiated, is transferred to a low temperature environment to reduce the apparent reaction rate, whereby there will be a problem that polymerization gradually proceeds during the storage, and the material is thereby cured and becomes useless. Further, from the viewpoint of resuming polymerization from a partially polymerized state, it is impossible to resume polymerization of a partially polymerized mixture which has once been deactivated, from such a deactivated state, and an additional mixing operation will be required to incorporate a fresh polymerization initiator, and such a method can hardly be useful for a common user who has no equipment required for such an operation.

SUMMARY OF THE INVENTION

The present invention has been made in view of the above-described prior art, and it is an object of the present invention to provide a process for producing a shaped product by a method of reducing polymerization shrinkage to prepare a molded product highly precisely in the shape of the mold or to prepare a compound product free from forming a space, wherein the method for reducing the polymerization shrinkage comprises preparing a partially polymerized mixture and resuming polymerization by an optional method, whereby the partially polymerized mixture can quantitatively be obtained, polymerization will not proceed during the storage, and polymerization can be resumed from the partially polymerized state without necessity of adding any active agent.

The present invention provides a process for producing a shaped product, which comprises polymerizing a mixture comprising a radical scavenger, a polymerization initiator and a radical polymerizable monomer to obtain a partially polymerized mixture having the conversion of the monomer into the polymer of from 5 to 90 wt %, filling the partially polymerized mixture in a predetermined cavity and then applying polymerization energy again to the partially polymerized mixture to complete polymerization.

DESCRIPTION OF THE PREFERRED EMBODIMENTS

In the present invention, the radical scavenger means what can temporarily terminate polymerization reaction by binding propagation radicals and can generate active radicals by reversibly dissociating. The radical scavenger may or may not be a radical when the mixture is prepared.

In the present invention, the polymerization initiator is what generates radicals having a polymerization initiation function upon exposure to energy such as light and heat.

In the present invention, the partially polymerized mixture means a mixture of a polymer and an unpolymerized monomer having the conversion of the monomer into the polymer below 100%.

Now, the present invention will be described in detail with reference to the preferred embodiments.

According to the present invention, a shaped product can be prepared highly precisely, as mentioned above, by polymerizing a mixture comprising a radical scavenger, a polymerization initiator and a radical polymerizable monomer to obtain a partially polymerized mixture having the conversion of the monomer into the polymer of from 5 to 90 wt %, filling the partially polymerized mixture into a predetermined cavity and then applying polymerization energy again to the partially polymerized mixture to complete polymerization.

The process for producing a shaped product of the present invention has a feature that a radical scavenger and a polymerization initiator are used in combination.

In a case where a conventional radical polymerization initiator which initiates polymerization by forming active free radicals upon thermal cleavage, such as azobisisobutyronitrile, or by forming active radicals upon photolysis, such as benzil or benzophenone, is used alone as a polymerization initiator, the progress of the polymerization reaction at growing terminals of the polymer will stop due to various elementary reactions such as a chain transfer reaction which transfers the chain to the initiator fragment, other polymers or the solvent or a chain termination reaction. At the growing terminals at which the progress of the polymerization reaction has been thus terminated, the polymerization reaction no longer resumes.

In contrast, the system using a radical scavenger and a polymerization initiator I—I in combination of the present invention is presumed to undergo the following reactions upon exposure to energy such as ultraviolet rays or heat.

Firstly, an initiator fragment I• is formed, as shown by the formula (A):

$$I-I \rightarrow I\bullet + I\bullet \quad (A)$$

wherein I• is an initiator fragment. This initiator fragment I• induces monomer M to initiate polymerization as shown by the formula (B):

$$I\bullet + M \rightarrow I-M\bullet \quad (B)$$

wherein M is a monomer, whereby a propagation reaction proceeds as shown by the formula (C):

$$IM\bullet + nM \rightarrow IM_{n+1}\bullet \quad (C)$$

Thereafter, the growing terminal of polymerized polymer $IM_{n+1}\bullet$ chain-transfers to relatively stable free radical T• as shown by the formula (D):

$$IM_{n+1}\bullet + T\bullet \rightarrow IM_{n+1}T \quad (D)$$

wherein T• is a radical scavenger. The terminal of this formed polymer $IM_{n+1}T$ again undergoes cleavage as shown by the formula (E) so long as it is subjected to energy such as ultraviolet rays or heat:

$$IM_{n+1}T \rightarrow IM_{n+1}\bullet + T\bullet \quad (E)$$

and monomer M is added to the growing terminal $IM_{n+1}\bullet$ of the polymer again, so that the polymer chain is extended as shown by the formula (F):

$$IM_{n+1}\bullet + M \rightarrow IM_{n+2}\bullet \quad (F)$$

The radical T• which acts as the radical scavenger may or may not have a polymerization initiation function.

As described above, the polymerization using a radical scavenger and a polymerization initiator in combination in the present invention proceeds like living polymerization as represented by the formulas (A) to (F). In other words, the polymerization initiator has a nature such that when subjected to energy, it promotes the polymerization reaction of the monomer, and when it is no longer subjected to energy, it allows the radical scavenger to readily stop the polymerization reaction of the monomer, and when it is subjected to energy again, it again serves to initiate the polymerization reaction of the monomer.

Accordingly, if a monomer is polymerized to an optional partially polymerized state for example by irradiation with ultraviolet rays, and if the irradiation with the ultraviolet rays is stopped, the partially polymerized state can be maintained without further progress of polymerization. When required, this partially polymerized mixture is filled in a predetermined mold or cavity and again irradiated with ultraviolet rays, whereupon polymerization will be initiated, and when the monomer is eventually exhausted, polymerization finishes and a shaped product is obtained. In contrast with conventional radical polymerization initiators which irreversibly induce a chain transfer or termination reaction, the present invention provides a reversible polymerization characteristic such that regeneration of growth active species can be carried out solely by the presence or absence of external energy such as ultraviolet rays.

The radical scavenger to be used in the present invention is preferably at least one member selected from the group consisting of a stable nitroxy radical, a carbamate compound and an iodine compound.

A typical example of the above stable nitroxy radical may, for example, be a stable nitroxy radical of the formula (I):

wherein each of $R^1$ and $R^2$ which are independent of each other, is a linear or branched $C_{1-10}$ alkyl or alkylene group (provided that when $R^1$ and $R^2$ are alkylene groups, $R^1$ and $R^2$ are connected via an organic group) which may have a substituent selected from the group consisting of a hydroxyl group, a cyano group, an amino group, a group having an ester bond, a carbonyl group and a group containing an aromatic substitution product.

When $R^1$ and $R^2$ in the formula (I) are alkylene groups, as the organic group which connects $R^1$ and $R^2$, for example, a 1,1,4,4-tetramethylbutylene group, a 1,1,5,5-tetramethylpentylene group or a 1,1,6,6-tetramethylhexylene group may be mentioned. Specific examples of the stable nitroxy radical of the formula (I) include 2,2,6,6-tetramethyl-1-piperidinyloxy, 4-amino-2,2,6,6-tetramethyl-1-piperidinyloxy, 4-acetamide-2,2,6,6-tetramethyl-1-piperidinyloxy, 4-phosphonooxy-2,2,6,6-tetramethyl-1-piperidinyloxy, 4-carboxy-2,2,6,6-tetramethyl-1-piperidinyloxy, 4-cyano-2,2,6,6-tetramethyl-1-piperidinyloxy, 4-hydroxy-2,2,6,6-tetramethyl-1-piperidinyloxy, 3-aminomethyl-2,2,5,5-tetramethyl-1-pyrrolidinyloxy, 3-carbamoyl-2,2,5,5-tetramethyl-1-pyrrolidinyloxy, 3-carboxy-2,2,5,5-tetramethyl-1-pyrrolidinyloxy, 3-cyano-2,2,5,5-tetramethyl-1-pyrrolidinyloxy, 3-maleimido-2,2,5,5-tetramethyl-1-pyrrolidinyloxy, 3-(4-nitrophenoxycarbonyl) -2,2,5,5-tetramethyl-1-pyrrolidinyloxy, 3,3-dimethyl-1-oxa-4- azaspiro[4.5]dec-4-yloxy, 2-butyl-4,4-dimethyl-2-pentyl-3-oxazolidinyloxy, 4,4-dimethyl-2,2-dinonyl-3-oxazolidinyloxy, 4-phenacylidene-2,2,5,5-tetramethylimidazolidin-1-yloxy, 4-acetyl-2,2,6,6-tetramethyl-piperazinyloxy, 2,2,5,5-tetramethyl-3-carbamido-3-pyrroline-1-oxyl, N,N-di-t-butylaminoxyl, N,N-di-(1,1-dimethylethyl)aminoxyl, 2,2,7,7-tetramethyl-1-homopiperidinyloxy, 4-amino-2,2,7,7-tetramethyl-1-homopiperidinyloxy, 4-acetamido-2,2,7,7-tetramethyl-1-homopiperidinyloxy, 4-phosphonooxy-2,2,7,7-tetramethyl-1-homopiperidinyloxy, 4-carboxy-2,2,7,7-tetramethyl-1-homopiperidinyloxy, 4-cyano-2,2,7,7-tetramethyl-1-homopiperidinyloxy, 4-hydroxy-2,2,7,7-tetramethyl-1-homopiperidinyloxy, 4-maleimide-2,2,7,7-tetramethyl-1-homopiperidinyloxy and 4-(4-nitrobenzoyloxy)-2,2,7,7-tetramethyl-1-homopiperidinyloxy. These stable nitroxy radicals may be used alone or in combination as a mixture of two or more of them.

A typical example of the above carbamate compound may, for example, be a carbamate compound having a group of the formula (II):

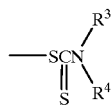

(II)

wherein each of $R^3$ and $R^4$ which are independent of each other, is a hydrogen atom or a $C_{1-10}$ alkyl group.

A typical example of the above carbamate compound may be a carbamate compound of the formula (III):

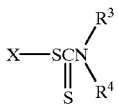

(III)

wherein each of $R^3$ and $R^4$ which are independent of each other, is a hydrogen atom or a $C_{1-10}$ alkyl group, and X is an organic group such as a $C_{1-10}$ alkyl group and a benzene substitution product represented by a benzyl group, a carbamate compound of the formula (IV):

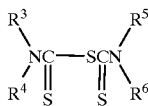

(IV)

wherein each of $R^3$, $R^4$, $R^5$ and $R^6$ which are independent of one another, is a hydrogen atom or a $C_{1-10}$ alkyl group, a carbamate compound of the formula (V):

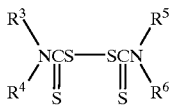

(V)

wherein $R^3$, $R^4$, $R^5$ and $R^6$ are as defined above, a carbamate compound of the formula (VI):

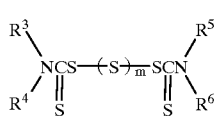

(VI)

wherein $R^3$, $R^4$, $R^5$ and $R^6$ are as defined above, and m is 1 or 2, or a carbamate compound of the formula (VII):

(VII)

wherein each of $R^3$ and $R^4$ which are independent of each other, is a hydrogen atom or a $C_{1-10}$ alkyl group, $Z^1$ is an organic group such as a 2 to 40 valent hydrocarbon group, or a 2 to 6 valent group containing a benzene substitution product, and n is an integer of from 2 to 40.

Specific examples of the carbamate compounds of the formulae (III) to (VII) include n-butyl N,N-dimethyl-dithiocarbamate, benzyl dithiocarbamate, benzyl N,N-dimethyl-dithiocarbamate, benzyl N,N-diethyl-dithiocarbamate, thiuram monosulfide, N,N'-dimethylthiuram monosulfide, N,N,N',N'-tetramethylthiuram monosulfide, N,N'-diethylthiuram monosulfide, N,N,N',N,'-tetraethylthiuram monosulfide, thiuram disulfide, N,N-dimethylthiuram disulfide, N,N,N',N'-tetramethylthiuram disulfide, N,N -diethylthiuram disulfide, N,N'-dimethylthiuram tetrasulfide, N,N,N',N'-tetraethylthiuram disulfide, p-xylenebis(dithiocarbamate), p-xylenebis(N,N-dimethyldithiocarbamate), p-xylenebis(N,N-diethyldithiocarbamate), 1,2-bis(N,N-diethyldithiocarbamyl)ethane, 1,2-bis(N,N-dimethyldithiocarbamyl)ethane, 1,2,3-tris(N,N-dimethyldithiocarbamyl)propane, 1,2,4,5-tetrakis(N,N-diethyldithiocarbamylmethyl)benzene and 1-(N,N-diethyldithiocarbamyl)ethyl acetate. These carbamate compounds may be used alone or in combination as a mixture of two or more of them.

Specific examples of the iodine compound include iodoform, diiodomethane, iodo-1-phenylethane, benzil iodide, iodoethane, 1,1-diiodoethane, 1,1,1-triiodoethane, 1,2-diiodoethane, 1-iodo-2-methylpropane, 2-(1-ethoxy) ethyl acetate, methyl 2-iodo-2-butanoate, ethyl 2-iodo-2-butanoate, methyl 2-iodopropionate, ethyl 2-iodopropionate, 4-iodotoluene, 3-iodotoluene, 2-iodoethyl acetate and 2-iodoethyl propionate. They may be used alone or in combination as a mixture of two or more of them.

The polymerization initiator to be used in the present invention together with the radical scavenger such as a stable nitroxy radical, a carbamate compound or an iodine compound, is a radical initiator used for usual radical polymerization.

As a typical example of the radical initiator, for example, peroxides such as benzoyl peroxide, acetyl peroxide, lauroyl peroxide, potassium peroxydisulfate, ammonium peroxydisulfate, cumene hydroperoxide, t-butyl hydroperoxide, dicumyl peroxide and di-t-butyl peroxide; azo compounds such as azobisisobutyronitrile, azobis-2,4-dimethylvaleronitrile, azobiscyclohexanecarbonitrile and azobis-2-amidinopropane hydrochloride; redox type combinations such as potassium peroxydisulfate-sodium sulfite and ammonium peroxydisulfate-sodium sulfite; and photo-initiator such as benzil, benzophenone, acetophenone, trichloroacetophenone, methylbenzoyl formate and 2-hydroxy-2-methyl-1-phenylpropane-1-one may be mentioned.

The radical polymerizable monomer to be used in the present invention may be suitably selected for use depending upon the particular purpose of the shaped product, among those polymerizable by the above described combination of a radical scavenger and a polymerization initiator.

Especially, a monomer containing a polymerizable unsaturated double bond selected from the group consisting of an acryloyl group, a methacryloyl group, a vinyl group and an allyl group is particularly suitable for use in the present invention, since such a monomer is excellent in the polymerizability by the combination of a radical scavenger and a polymerization initiator. Typical examples of such a monomer include alkyl (meth)acrylates such as methyl (meth) acrylate, ethyl (meth)acrylate, propyl (meth)acrylate and butyl (meth)acrylate; fluoroalkyl (meth)acrylates such as trifluoroethyl (meth)acrylate, tetrafluoropropyl (meth) acrylate, hexafluoroisopropyl (meth)acrylate and octafluoropentyl (meth)acrylate; silicon-containing (meth)acrylates such as trimethylsilylpropyl (meth)acrylate and tris (trimethylsiloxy)silylpropyl (meth)acrylate; hydroxyalkyl (meth)acrylates such as 2-hydroxyethyl (meth)acrylate and 2-hydroxybutyl (meth)acrylate; (meth)acrylamides such as (meth)acrylamide, N,N-dimethyl(meth)acrylamide and N,N-diethyl(meth)acrylamide; styrene; alkylstyrenes such as o-methylstyrene, m-methylstyrene, p-methylstyrene, o-ethylstyrene, m-ethylstyrene, p-ethylstyrene, o-octylstyrene, m-octylstyrene and p-octylstyrene; fluoroalkylstyrenes such as o-trifluoromethylstyrene, m-trifluoromethylstyrene and p-trifluoromethylstyrene; silicon-containing styrenes such as o-trimethylsilylstyrene, m-trimethylsilylstyrene, p-trimethylsilylstyrene, o-tris (trimethylsiloxy)silylstyrene, m-tris(trimethylsiloxy) silylstyrene and p-tris(trimethylsiloxy)silylstyrene; vinyl acetate; (meth)acrylonitrile; (meth)acrylic acid; α-methylstyrene; and N-vinylpyrrolidone. These monomers may be used alone or in combination as a mixture of two or more of them.

In this specification, "(meth)acryl . . ." means "acryl . . ." and/or "methacryl . . .".

To improve the mechanical strength or durability of a shaped product, it is preferred to employ a crosslinkable monomer which is a polyfunctional polymerizable compound having at least two copolymerizable unsaturated double bonds in one molecule.

Such a crosslinkable monomer may, for example, be ethylene glycol di(meth)acrylate, diethylene glycol di(meth) acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, 3-acryloyloxy-2-hydroxypropyl methacrylate, 3-acryloyloxypropyl methacrylate, butanediol (meth) acrylate, divinylbenzene, diallyl phthalate, diallyl adipate, 2,2-bis(4-(meth)acryloyloxyethoxyphenyl)propane, 2,2-bis (4-(meth)acryloyloxypolyethoxyphenyl)propane, 2,2-bis [(4-(3-(meth)acryloyloxy-2-hydroxypropoxy)-phenyl] propane, di((meth)acryloyloxyethyl) trimethylhexamethylene diurethane, triallyl isocyanurate, α-methylene-N-vinylpyrrolidone, 4-allylbenzyl (meth) acrylate, 4-vinylbenzyl (meth)acrylate, 3-vinylbenzyl (meth)acrylate, 2,2-bis(p-(meth)acryloyloxyphenyl) hexafluoropropane, 2,2-bis(m-(meth)acryloyloxyphenyl) hexafluoropropane, 2,2-bis(o-(meth)acryloyloxyphenyl) hexafluoropropane, 2,2-bis(p-(meth)acryloyloxyphenyl) propane, 2,2-bis(m-(meth)acryloyloxyphenyl)propane, 2,2-bis(o-(meth)acryloyloxyphenyl)propane, 1,4-bis(2-(meth) acryloyloxyhexafluoroisopropyl)benzene, 1,3-bis(2-(meth) acryloyloxyhexafluoroisopropyl)benzene, 1,2-bis(2-(meth) acryloyloxyhexafluoroisopropyl)benzene, 1,4-bis(2-(meth) acryloyloxy isopropyl)benzene, 1,3-bis(2-(meth) acryloyloxyisopropyl)benzene or 1,2-bis(2-(meth) acryloyloxyisopropyl)benzene. These crosslinkable monomers may be used alone or in combination as a mixture of two or more of them.

The amount of the crosslinkable monomer may usually be suitably adjusted depending upon the type of the shaped product.

In the present invention, the viscosity of the partially polymerized mixture having the conversion of the monomer into the polymer of from 5 to 90 wt %, is influential over the operation efficiency for filling the partially polymerized mixture in a predetermined cavity such as in a mold. Accordingly, in the present invention, it is preferred to adjust the amount of the crosslinkable monomer within a range not to adversely affect the viscosity of the partially polymerized mixture.

The amount of the crosslinkable monomer can not generally be defined, since the viscosity of the partially polymerized mixture differs depending upon the type of the monomer used or upon the conversion of the monomer into the polymer of the partially polymerized mixture. Usually, however, it is preferably at least 0.01 wt % based on the total amount of the monomer used, in order to sufficiently obtain the crosslinking effect and at most 5 wt % to avoid high viscosity.

Now, some examples for using the above monomers depending upon the types and uses of shaped products will be described.

For example, in a case where an optical lens such as an intraocular lens, a camera lens or a lens for spectacles is to be prepared, it is preferred to use a monomer comprising methyl methacrylate as the main component. In a case where a plastic optical fiber is to be prepared, it is preferred to use a monomer comprising methyl methacrylate as the main component for the core portion and a monomer comprising a fluoroalkyl methacrylate as the main component for the shell portion. Further, for example, in a case where a contact lens having high oxygen permeability is to be prepared, it is preferred to use methyl methacrylate in combination with a silicon-containing methacrylate such as trimethylsilylpropyl methacrylate or tris(trimethylsiloxy)silylpropyl methacrylate, a fluorine-containing (meth)acrylate such as 2,2,2-trifluoroethyl (meth)acrylate or 2,2,2,2',2',2'-hexafluoroisopropyl (meth)acrylate, a silicon-containing styrene such as tris(trimethylsiloxy)silylstyrene, or a hydrophilic monomer such as N-vinylpyrrolidone or methacrylic acid.

The polymerization behavior of the above mixture comprising the radical scavenger, the polymerization initiator and the radical polymerizable monomer, is like living polymerization, and the molecular weight of the resulting polymer is influenced by the amount of the polymerization initiator.

In general, if the amount of the polymerization initiator is small, the molecular weight of the resulting polymer becomes high, whereby the viscosity of the partially polymerized mixture tends to be high, which in turn adversely affects the operation efficiency in filling the partially polymerized mixture in a predetermined cavity such as in a mold. Further, if the amount of the polymerization initiator is small, the time required for polymerization tends to be long. From these viewpoints, the amount of the polymerization initiator is usually at least 0.005 part by weight, preferably at least 0.01 part by weight, per 100 parts by weight of the radical polymerizable monomer.

On the other hand, if the amount of the polymerization initiator is too large, the molecular weight of the resulting polymer tends to be low, and the mechanical strength tends to be low. Accordingly, the amount of the polymerization initiator is usually at most 10 parts by weight, preferably at most 5 parts by weight, per 100 parts by weight of the radical polymerizable monomer.

As described above, the combined use of a polymerization initiator and a radical scavenger is a major feature of the present invention. In the process of the present invention, if the amount of the radical scavenger is too small, propagation radicals undergo a termination reaction such as recombination or disproportionation during polymerization, and if polymerization energy is given to the partially polymerized mixture again, polymerization can not be resumed. To avoid this, the amount of the radical scavenger is usually at least 10 mols, preferably at least 30 mols, per 100 mols of the initiation fragment generated from the polymerization initiator used.

On the other hand, if the amount of the radical scavenger is too large, the radical concentration of the system during polymerization is so low that long time is required for polymerization. From these viewpoints, the amount of the radical scavenger is usually at most 500 mols, preferably at most 200 mols, per 100 mols of the initiator fragment generated from the polymerization initiator used.

However, when 1 mol of the radical scavenger used generates at least 2 mols of the stable radical (T•), the amount of the radical scavenger can be decreased according to the number of mols of the stable radical generated.

If necessary, an additive such as a dye, a pigment, a filler or an antioxidant, may be added to the mixture containing the radical scavenger, the polymerization initiator and the radical polymerizable monomer within a range not to defeat the purpose of the present invention. When such additives are to be employed, it is preferred to mix them so that the additives are uniformly dispersed or dissolved in the mixture comprising the radical scavenger, the polymerization initiator and the radical polymerizable monomer.

Further, if necessary, a solvent or the like may be added to the mixture comprising the radical scavenger, the polymerization initiator and the radical polymerizable monomer.

As such a solvent, it is preferred to employ a solvent which is capable of dissolving the radical polymerizable monomer, the radical scavenger, the polymerization initiator and the additives as well as the resulting polymer and which does not hinder the polymerization of the above monomer and does not show a characteristic absorption in the wavelength region of light rays for polymerization when polymerization is induced by light. As a solvent having such a nature, toluene, xylene, ethylbenzene, acetone, methyl ethyl ketone, ethyl acetate, dimethylformamide, isopropyl alcohol, hexane or heptane may, for example, be mentioned.

A partially polymerized mixture having the conversion of the monomer into the polymer of from 5 to 90 wt % is prepared by polymerizing a mixture comprising the radical scavenger, the polymerization initiator and the radical polymerizable monomer or, if necessary, a solution of a mixture comprising the radical scavenger, the polymerization initiator and the radical polymerizable monomer dissolved in the above-described solvent.

As a method for polymerizing the mixture, photopolymerization or heat polymerization may, for example, be mentioned.

The polymerization energy to be used for polymerizing the mixture may, for example, be electromagnetic radiation energy such as light rays or heat energy generated by e.g. heating. These types of energy may be used alone or in combination.

Ultraviolet light may be mentioned as typical light rays (electromagnetic radiation) to be used for the photopolymerization. The intensity and the wavelength of such ultraviolet light can not be generally defined, since they vary depending upon the types of the radical scavenger, the polymerization initiator and the monomer used, etc. Usually, the wavelength of such ultraviolet rays is preferably at least 250 nm to avoid decomposition of the monomer by excitation. On the other hand, if the wavelength of ultraviolet light becomes long and close to the wavelength of visible light, it will be necessary to take care to block visible light, and the operation tends to be somewhat cumbersome. Accordingly, the wavelength of the ultraviolet light is preferably at most 450 nm.

In a case where polymerization of the monomer is induced by irradiation with light rays, it is possible to conduct the polymerization by putting the monomer in a container which transmits a light ray and irradiating the monomer with light rays from the exterior of the container. The temperature at that time may be room temperature or higher or lower than room temperature. From the viewpoint of the operation efficiency, the temperature is preferably room temperature.

On the other hand, in a case where the polymerization is induced by heating, the heating temperature is usually from 10 to 250° C., preferably from 50 to 130° C. Since the optimum temperature varies depending on the radical scavenger and the polymerization initiator used, the heating temperature is preferably varied according to the types of the radical scavenger and the polymerization initiator used.

In the case where the polymerization is induced by irradiation with light rays, the polymerization time varies due to a delicate difference in the distance from the light source, the type of the container used or the amount of the monomer, even if the same monomer, the same radical scavenger and the same polymerization initiator are employed. Therefore, the polymerization time can not generally be defined, and it is preferably appropriately adjusted depending upon various polymerization conditions.

As mentioned above, the present invention is characterized by the use of a radical scavenger, whereby the progress and termination of polymerization of the monomer can be controlled by adjusting the irradiation and termination of light rays or by adjusting the heating.

Accordingly, a partially polymerized mixture having a predetermined conversion of the monomer into the polymer can be prepared by polymerizing the mixture comprising the radical scavenger, the polymerization initiator and the radical polymerizable monomer in such a manner that when polymerization of the monomer has progressed to the predetermined conversion of the monomer into the polymer, radiation of light ray or heating is stopped for light shielding or cooling.

Here, the conversion of the monomer into the polymer in this specification is represented by the weight percentage obtained by dividing the amount (by weight) of the monomer before initiation of the polymerization by the amount (by weight) of the polymerized monomer, as represented by the formula:

$$\text{Conversion of the monomer into the polymer (wt \%)} = \frac{\text{Amount of polymerized monomer (weight)}}{\text{Amount of monomer before polymerization (weight)}} \times 100.$$

To reduce polymerization shrinkage, the conversion of the monomer into the polymer of the partially polymerized mixture obtainable by polymerizing the mixture comprising the radical scavenger, the polymerization initiator and the radical polymerizable monomer is adjusted to be at least 5 wt %, preferably at least 10 wt %, more preferably at least 15 wt %. On the other hand, to avoid a possibility that the viscosity of the partially polymerized mixture tends to be so high that the operation efficiency for filling the partially polymerized mixture in a prescribed cavity tends to deteriorate, the conversion of the monomer into the polymer is usually at most 90 wt %, preferably at most 80 wt %.

In order to stop the polymerization when it has reached the desired conversion of the monomer into the polymer, it is preferred to preliminarily grasp the relation between the conversion of the monomer into the polymer and the irradiation time of light rays or the heating time.

The partially polymerized mixture thus obtained may be immediately used for the subsequent step or may be stored so that it can be used when required.

With the above partially polymerized mixture, when a radical scavenger and a polymerization initiator capable of functioning with light are used, polymerization does not proceed under a condition where light rays are blocked. Likewise, when a radical scavenger and a polymerization initiator capable of functioning with heat is used, polymerization does not proceed at a temperature lower than the critical temperature for polymerization. Therefore, the partially polymerized mixture can be stored in that state. Accordingly, when the above partially polymerized mixture is to be stored, it is necessary to shield it from light so that the partially polymerized mixture will not be irradiated with light rays, or to keep it at a temperature lower than the threshold temperature, preferably under a low temperature condition.

Some of the above-mentioned radical scavengers may decompose during the storage of the partially polymerized mixture and cause curing of the partially polymerized mixture. Accordingly, the temperature during the storage of the partially polymerized mixture obtained by using such a radical scavenger should preferably not be so high. From such a viewpoint, when the above partially polymerized mixture is stored, it is generally preferred to store it at a temperature not higher than room temperature.

The feature that the partially polymerized mixture can be stored as described above, brings a wide range of merits. For example, the manufacturers are able to keep the partially polymerized mixture in stock after its preparation until its use for the preparation of a shaped product.

Then, the partially polymerized mixture is again irradiated with light rays or heated to complete its polymerization.

Heretofore, to prepare a shaped product from the partially polymerized mixture, it has been required to add a polymerization initiator or the like afresh in order to resume the polymerization. However, if a polymerization initiator is added to such a partially polymerized mixture, it is difficult to uniformly disperse such a polymerization initiator in the partially polymerized mixture, and as mentioned above, such a method can not be used by a user who has no equipment required to mix such a polymerization initiator.

In contrast, with the partially polymerized mixture used in the present invention, polymerization can be resumed simply by irradiation with light rays or by heating without adding a polymerization initiator afresh, whereby a shaped product having a uniform composition can be simply and economically prepared.

By filling the above partially polymerized mixture in a predetermined cavity such as a mold and completing the polymerization, it is possible to obtain a molded product having excellent transferability of the mold or a cured material free from voids.

In a case where the above molded product is a lens for spectacles or an ocular lens such as a contact lens, the above partially polymerized mixture is filled in a cavity of a mold having the predetermined lens shape, followed by irradiation with light rays or heating to complete the polymerization to prepare a lens having the predetermined shape.

It is thereby possible to obtain a shaped product having a highly accurate predetermined shape, since it is polymerized to a predetermined conversion of the monomer into the polymer already at the stage of preparation of the partially polymerized mixture, and polymerization shrinkage at the stage of preparation of the shaped product from the partially polymerized mixture is very small.

EXAMPLES

Now, the process for producing a shaped product of the present invention will be described in further detail with reference to Examples. However, it should be understood that the present invention is by no means restricted to such specific Examples.

Example 1

100 parts by weight of styrene as a monomer was mixed with 0.53 part by weight of azobisisobutyronitrile as a polymerization initiator and 1 part by weight of 2,2,6,6-tetramethyl-1-piperidinyloxy as a radical scavenger to obtain a mixture having a uniform composition. 20 g of the resulting mixture was sealed in a vial (V-20, manufactured by Nichiden Rika Glass K.K.), and left to stand in an oil bath at about 100° C. for 4 hours and at about 130° C. for 2 days to a partially polymerized state. As a result, increase in viscosity was observed, and a partially polymerized mixture was obtained.

Then, the conversion of the monomer into the polymer and the molecular weight of the resulting partially polymerized mixture were measured by a gel permeation chromatograph provided with an ultraviolet absorbance detector and a differential refractometer. As a result, the conversion of the monomer into the polymer was about 66 wt %, and the number average molecular weight was about 10,600.

The conditions for analysis by the gel permeation chromatograph were as follows.

Instrument: DG-980-50 (3-Line Degasser), PU-980 (HPLC pump), CO-965 (column oven), RI-930 (RI detector) and UV-970 (UV-VIS detector) manufactured by Nippon Bunko K.K.

Eluent: Tetrahydrofuran (THF) of the guaranteed grade, Nakaraitesque

Flow rate: 1 me/min

Column temperature: 40° C.

Column: KF805+KF804+KF803 +Waters Ultrastyragel 100 Å+KF801 connected in series in this order in the direction of the flow Exclusion limit of molecular weight: About 3,000,000 to several tens Sample loop volume: 100 μl Detector: An RI detector and a UV detector (detection wavelength: 280 nm for styrene, and 240 nm for others) arranged in series Data processor: CR-7Ae Sensitivity: RI×4 UV×(10 for styrene, and 7 for methyl methacrylate, n-butyl acrylate and n-butyl methacrylate)

Sample concentration: Adjusted to about 0.1 wt % in THF solution

Injection volume: About 0.5 ml

Then, the partially polymerized mixture thus obtained was put into a vial again and heated at about 130° C., whereupon polymerization was resumed and completed to obtain a polymer (a shaped product).

The polymerization shrinkage of the product thus obtained was calculated by the following formula and found to be 6.7%.

$$\text{Polymerization shrinkage (\%)} = \frac{\text{Filled mixture volume} - \text{Volume of product after curing}}{\text{Filled mixture volume}} \times 100$$

Comparative Example 1

100 parts by weight of styrene as a monomer was mixed with 0.53 part by weight of azobisisobutyronitrile as a polymerization initiator to obtain a mixture having a uniform composition. 20 g of the resulting mixture was sealed in the same vial as used in Example 1, and left to stand in an oil bath at 50° C. for 22 hours, at 60° C. for 8 hours and at 80° C. for 72 hours, whereupon polymerization completed, and a polymer was obtained.

Then, the polymerization shrinkage of the resulting polymer was calculated in the same manner as in Example 1 and found to be 17%, which indicates about 2.5 times the shrinkage in Example 1.

From the results of Example 1 and Comparative Example 1, it is evident that when a process which comprises preparing a partially polymerized mixture by using a radical scavenger and a polymerization initiator and then preparing a shaped product, is used as in Example 1, polymerization can be resumed and completed by such a simple operation as heating in that state, whereby it is possible to obtain a shaped product having a small polymerization shrinkage.

Example 2

100 parts by weight of styrene as a monomer was mixed with 0.53 part by weight of azobisisobutyronitrile as a polymerization initiator and 1 part by weight of 2,2,6,6-tetramethyl-1-piperidinyloxy as a radical scavenger to obtain a mixture having a uniform composition. 20 g of the resulting mixture was sealed in the same vial as in Example 1, and left to stand in an oil bath at about 90° C. for 3 hours and at 125° C. for 20 hours to a partially polymerized state. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 28 wt %, and the number average molecular weight was about 5,630.

Further, the above partially polymerized mixture was stored for about 2 weeks at low temperature (about 5° C.) or at room temperature and then analyzed in the same manner. There was no change in the conversion of the monomer into the polymer or the number average molecular weight, and no progress in polymerization during this period was observed. Thus, it was demonstrated that the partially polymerized mixture was excellent in stability during storage.

Comparative Example 2

100 parts by weight of styrene as a monomer was mixed with 0.79 part by weight of azobisisobutyronitrile as a polymerization initiator to obtain a mixture having a uniform composition. 10 g of the resulting mixture was sealed in the same vial as in Example 1, and left to stand in an oil bath at about 60° C. for 2 hours to a partially polymerized state. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 13 wt %, and the number average molecular weight was about 97,800.

Further, the above partially polymerized mixture was stored at low temperature (about 5° C.) or at room temperature and then analyzed in the same manner. As a result, it was found that both the conversion of the monomer into the polymer and the number average molecular weight had changed. The conversion of the monomer into the polymer and the number average molecular weight were 79 wt % and 126,000, respectively, after 19 days of storage at room temperature, which indicates progress of polymerization during the storage and poor storage stability.

From the results of Example 2 and Comparative Example 2, it is evident that when a process which comprises preparing a partially polymerized mixture by using a radical scavenger and a polymerization initiator, is used as in Example 2, storage stability in a partially polymerized state is excellent.

Example 3

100 parts by weight of styrene as a monomer was mixed with 0.62 part by weight of benzoyl peroxide as a polymerization initiator and 0.6 part by weight of 2,2,6,6-tetramethyl-1-piperidinyloxy as a radical scavenger to obtain a mixture having a uniform composition. 20 g of the resulting mixture was sealed in the same vial as in Example 1, and left to stand in an oil bath at about 100° C. for 90 minutes and at 135° C. for 330 minutes to a partially polymerized state. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 28 wt %, and the number average molecular weight was about 8,560.

Further, the above partially polymerized mixture was stored for 13 days at low temperature (about 5° C.) and then analyzed in the same manner. There was no change in the conversion of the monomer into the polymer or the number average molecular weight, and no progress in polymerization during this period was observed. Thus, it was demonstrated that the partially polymerized mixture was excellent in stability during storage.

Then, the partially polymerized mixture was put into a vial again and heated at about 130° C., whereupon polymerization was resumed and completed to obtain a polymer (a shaped product).

From these results, it is evident that when a radical scavenger and a polymerization initiator are used in combination, it is possible to stop, resume and complete polymerization freely, and storage stability in a partially polymerized state is excellent.

Example 4

100 parts by weight of styrene as a monomer was mixed with 0.79 part by weight of 2-hydroxy-2-methyl-1-phenylpropan-1-one (Darocure 1173, tradename, manufactured by Ciba-Geigy Corp.) as a polymerization initiator and 1.42 parts by weight of N,N,N',N'-tetraethylthiuram disulfide as a radical scavenger to obtain a mixture having a uniform composition. 20 g of the resulting mixture was poured into a sample bottle (SV-20, manufactured by Nichiden Rika Glass K.K.) and irradiated with light rays (ultraviolet light) from a distance of 10 cm by a black light (National Black Light Blue FL10BL-B, manufactured by Matsushita Electric Industrial Co., Ltd.) to a partially polymerized state, while stirred with a magnetic stirrer. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 39 wt %, and the number average molecular weight was about 10,700.

Further, the above partially polymerized mixture was stored for about 15 days at low temperature (about 5° C.) or at room temperature, while shielded from light, and then analyzed in the same manner. There was no change in the conversion of the monomer into the polymer or the number average molecular weight, and no progress in polymerization during this period was observed. Thus, it was demonstrated that the partially polymerized mixture was excellent in stability during storage.

Comparative Example 3

100 parts by weight of styrene as a monomer was mixed with 0.79 part by weight of 2-hydroxy-2-methyl-1-phenylpropan-1-one as a polymerization initiator like Example 4 to obtain a mixture having a uniform composition. 20 g of the resulting mixture was poured into the same sample bottle as in Example 4 and irradiated with light rays (ultraviolet light) from a distance of 10 cm by the same black light as used in Example 4 to a partially polymerized state, while stirred with a magnetic stirrer. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 41 wt %, and the number average molecular weight was about 34,100.

Further, the above partially polymerized mixture was stored for about 20 days at low temperature (about 5° C.) or at room temperature, while shielded from light, and then analyzed in the same manner. As a result, it was found that polymerization gradually progressed during the storage at low temperature and at room temperature. The conversion of the monomer into the polymer had changed to 50 wt % after the storage at room temperature, which indicates poor storage stability.

From the results of Example 4 and Comparative Example 3, it is evident that when a process which comprises preparing a partially polymerized mixture by using a radical scavenger and a polymerization initiator, is used as in Example 4, storage stability in a partially polymerized state was excellent.

Example 5

100 parts by weight of methyl methacrylate as a monomer was mixed with 0.82 part by weight of 2-hydroxy-2-methyl-1-phenylpropan-1-one as a polymerization initiator and 1.5 parts by weight of N,N,N',N'-tetraethylthiuram disulfide as a radical scavenger like Example 4 to obtain a mixture having a uniform composition. 30 g of the resulting mixture was poured into the same sample bottle as in Example 4 and irradiated with light rays (ultraviolet light) from a distance of 10 cm by the same black light as used in Example 4 to a partially polymerized state, while stirred with a magnetic stirrer. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 47 wt %, and the number average molecular weight was about 15,700.

Further, the above partially polymerized mixture was stored for about 15 days at low temperature (about 5° C.) or at room temperature, while shielded from light, and then analyzed in the same manner. There was no change in the conversion of the monomer into the polymer or the number average molecular weight, and no progress in polymerization during this period was observed. Thus, it was demonstrated that the partially polymerized mixture was excellent in stability during storage.

Then, the partially polymerized mixture was put into a sample bottle again and irradiated with light rays (ultraviolet light) by a black light in the same manner as described above, whereupon polymerization was resumed and completed to obtain a polymer (a shaped product).

Comparative Example 4

100 parts by weight of methyl methacrylate as a monomer was mixed with 0.82 part by weight of 2-hydroxy-2-methyl-1-phenylpropan-1-one as a polymerization initiator like Example 4 to obtain a mixture having a uniform composition. 30 g of the resulting mixture was poured into the same sample bottle as in Example 4 and irradiated with light rays (ultraviolet light) from a distance of 10 cm by the same black light as used in Example 4 to a partially polymerized state, while stirred with a magnetic stirrer. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 20 wt %, and the number average molecular weight was about 37,600.

Further, the above partially polymerized mixture was stored for about 20 days at low temperature (about 5° C.) or at room temperature, while shielded from light, and then analyzed in the same manner. As a result, it was found that polymerization gradually progressed during the storage at low temperature and at room temperature. The conversion of the monomer into the polymer had changed to about 27 wt % after the storage at room temperature, which indicates poor storage stability.

From the results of Example 5 and Comparative Example 4, it is evident that when a process which comprises preparing a partially polymerized mixture by using a radical scavenger and a polymerization initiator, is used as in Example 5, storage stability in a partially polymerized state is excellent, and polymerization can be resumed and completed by such a simple operation as irradiation with light in that state.

Example 6

100 parts by weight of styrene as a monomer was mixed with 0.79 part by weight of azobisisobutyronitrile as a polymerization initiator and 1.4 parts by weight of N,N,N',N'-tetraethylthiuram disulfide as a radical scavenger to obtain a mixture having a uniform composition. 10 g of the resulting mixture was sealed in the same vial as in Example 1, and left to stand in an oil bath at about 70° C. for 4.5 hours to a partially polymerized state. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 44 wt %, and the number average molecular weight was about 17,700.

Further, the above partially polymerized mixture was stored for about 15 days at low temperature (about 5° C.), while shielded from light, and then analyzed in the same manner. There was no change in the conversion of the monomer into the polymer or the number average molecular weight, and no progress in polymerization during this period was observed. Thus, it was demonstrated that the partially polymerized mixture was excellent in stability during storage.

Then, the partially polymerized mixture was put into a vial again and heated at about 130° C., whereupon polymerization was resumed and completed to obtain a polymer (a shaped product).

Comparative Example 5

100 parts by weight of styrene as a monomer was mixed with 0.79 part by weight of azobisisobutyronitrile as a polymerization initiator to obtain a mixture having a uniform composition. 10 g of the resulting mixture was sealed in the same vial as in Example 1, and left to stand in an oil bath at about 60° C. for 2 hours to a partially polymerized state. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 13 wt %, and the number average molecular weight was about 97,800.

Further, the above partially polymerized mixture was stored for about 19 days at low temperature (about 5° C.) or at room temperature and then analyzed in the same manner. As a result, it was found that both the conversion of the monomer into the polymer and the number average molecular weight changed during the storage. The conversion of the monomer into the polymer and the number average molecular weight were 79 wt % and 343,000, respectively, after 19 days of storage at room temperature, which indicates progress of polymerization during the storage.

From the results of Example 6 and Comparative Example 5, it is evident that when a process which comprises preparing a partially polymerized mixture by using a radical scavenger and a polymerization initiator, is used as in Example 6, storage stability in a partially polymerized state is excellent, and polymerization can be resumed and completed by such a simple operation as heating in that state.

Example 7

100 parts by weight of n-butyl acrylate as a monomer was mixed with 0.11 part by weight of 2-hydroxy-2-methyl-1-phenylpropan-1-one as a polymerization initiator and 0.58 part by weight of N,N,N',N'-tetraethylthiuram disulfide as a radical scavenger like Example 4 to obtain a mixture having a uniform composition. 12.8 g of the resulting mixture was poured into the same sample bottle as in Example 4 and irradiated with light rays (ultraviolet light) from a distance of 10 cm by the same black light as used in Example 4 to a partially polymerized state, while stirred with a magnetic stirrer. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 54 wt %, and the number average molecular weight was about 30,500.

Further, the above partially polymerized mixture was stored for about 12 days at low temperature (about 5° C.) or at room temperature, while shielded from light, and then analyzed in the same manner. There was no change in the conversion of the monomer into the polymer or the number average molecular weight, and no progress in polymerization during this period was observed. Thus, it was demonstrated that the partially polymerized mixture was excellent in stability during storage.

Then, the partially polymerized mixture was put into a sample bottle again and irradiated with light rays (ultraviolet light) by a black light in the same manner as described above, whereupon polymerization was resumed and completed to obtain a polymer (a shaped product).

From these results, it is evident that when a radical scavenger and a polymerization initiator are used in combination, it is possible to stop, resume and complete polymerization freely, and storage stability in a partially polymerized state is excellent.

Example 8

100 parts by weight of methyl methacrylate as a monomer was mixed with 0.82 part by weight of azobisisobutyronitrile as a polymerization initiator and 1.5 parts by weight of N,N,N',N'-tetraethylthiuram disulfide as a radical scavenger to obtain a mixture having a uniform composition. 10 g of the resulting mixture was sealed in the same vial as in Example 1, and left to stand in an oil bath at about 70° C. for 4.5 hours to a partially polymerized state. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 41 wt %, and the number average molecular weight was about 22,500.

Further, the above partially polymerized mixture was stored for about 15 days at low temperature (about 5° C.) or at room temperature, while shielded from light, and then analyzed in the same manner. There was no change in the conversion of the monomer into the polymer or the number average molecular weight, and no progress in polymerization during this period was observed. Thus, it was demonstrated that the partially polymerized mixture was excellent in stability during storage.

Then, the partially polymerized mixture was put into a vial again and heated at 60° C. for 55 hours and at 80° C. for 65 hours, whereupon polymerization was resumed and completed to obtain a polymer (a shaped product).

Comparative Example 6

100 parts by weight of methyl methacrylate as a monomer was mixed with 0.82 part by weight of azobisisobutyronitrile as a polymerization initiator to obtain a mixture having a uniform composition. 10 g of the resulting mixture was sealed in the same vial as in Example 1, and left to stand in an oil bath at about 40° C. for 150 minutes to a partially polymerized state. As a result, increase in viscosity was observed, and a partially polymerized mixture was obtained.

Then, the conversion of the monomer into the polymer and the molecular weight of the resulting partially polymerized mixture were measured in the same manner as in Example 1. As a result, the conversion of the monomer into the polymer was about 9 wt %, and the number average molecular weight was about 302,000.

Further, the above partially polymerized mixture was stored for about 20 days at low temperature (about 5° C.) or at room temperature while shielded from light, and then analyzed in the same manner. As a result, it was found that both the conversion of the monomer into the polymer and the number average molecular weight changed during the storage. The conversion of the monomer into the polymer and the number average molecular weight were 16 wt % and 538,000, respectively, after the storage at low temperature, and 82 wt % and 555,000, respectively, after the storage at room temperature, which indicates progress of polymerization during the storage and poor storage stability.

From the results of Example 8 and Comparative Example 6, it is evident that when a process which comprises preparing a partially polymerized mixture by using a radical scavenger and a polymerization initiator, is used as in Example 6, storage stability in a partially polymerized state is excellent, and polymerization can be resumed and completed by such a simple operation as heating in that state.

Example 9

100 parts by weight of methyl methacrylate as a monomer was mixed with 0.82 part by weight of 2-hydroxy-2-methyl-1-phenylpropan-1-one as a polymerization initiator and 1.5 parts by weight of N,N,N',N'-tetraethylthiuram disulfide as a radical scavenger like Example 4 to obtain a mixture having a uniform composition. 30 g of the resulting mixture was poured into the same sample bottle as in Example 4 and irradiated with light rays (ultraviolet light) from a distance of 15 cm by the same black light as used in Example 4 to a partially polymerized state, while stirred with a magnetic stirrer. As a result, increase in viscosity was observed, and a partially polymerized mixture was obtained.

Then, the conversion of the monomer into the polymer was measured in the same manner as in Example 1. As a result, the conversion of the monomer into the polymer was about 36 wt %.

Then, the partially polymerized mixture was sealed in the same vial as Example 1, and left to stand in an oil bath at about 90° C. for 2 days, whereupon polymerization was resumed and completed to obtain a polymer (a shaped product).

Then, the polymerization shrinkage of the resulting polymer was calculated in the same manner as in Example 1 and found to be about 12.9%.

Comparative Example 7

100 parts by weight of methyl methacrylate as a monomer was mixed with 0.82 part by weight of 2-hydroxy-2-methyl-1-phenylpropan-1-one as a polymerization initiator like Example 4 to obtain a mixture having a uniform composition. 10 g of the resulting mixture was poured into the same sample bottle as in Example 4 and irradiated with light rays (ultraviolet light) from a distance of 15 cm by the same black light as used in Example 4 while stirred with a magnetic stirrer, whereupon polymerization completed, and a polymer was obtained.

Then, the polymerization shrinkage of the resulting polymer was calculated in the same manner as in Example 1 and found to be 20.9%. Thus, when polymerization was carried out without being stopped at a partially polymerized state, the polymerization shrinkage was about 1.6 times greater as compared with Example 9.

From the results of Example 9 and Comparative Example 7, it is evident that when a process which comprises preparing a partially polymerized mixture by using a radical scavenger and a polymerization initiator and then preparing a shaped product, is used as in Example 9, polymerization can be resumed and completed by such a simple operation as heating in that state, whereby it is possible to obtain a shaped product having a small polymerization shrinkage.

Example 10

42 parts by weight of styrene and 58 parts by weight of n-butyl methacrylate as monomers were mixed with 0.45 part by weight of azobisisobutyronitrile as a polymerization initiator and 0.85 part by weight of 2,2,6,6-tetramethyl-1-piperidinyloxy as a radical scavenger to obtain a mixture having a uniform composition. 12 g of the resulting mixture was sealed in the same vial as in Example 1, and left to stand in an oil bath at about 90° C. for 3 hours and at about 125° C. for 20 hours to a partially polymerized state. As a result, increase in viscosity was observed, and a partially polymerized mixture was obtained.

Then, the conversion of the monomer into the polymer of the resulting partially polymerized mixture was measured in the same manner as in Example 1. As a result, the conversion of the monomer into the polymer was 20 wt % for styrene, 19 wt % for n-butyl methacrylate and 20 wt % as a whole.

Further, the above partially polymerized mixture was stored for about 2 weeks at low temperature (about 5° C.) or at room temperature and then analyzed in the same manner. There was no change in the conversion of the monomer into the polymer, and no progress in polymerization during this period was observed. Thus, it was demonstrated that the partially polymerized mixture was excellent in stability during storage.

Then, the partially polymerized mixture was put into a vial again and heated at about 130° C., whereupon polymerization was resumed and completed to obtain a polymer (a shaped product).

Example 11

45 parts by weight of styrene and 55 parts by weight of n-butyl acrylate as monomers were mixed with 0.48 part by weight of azobisisobutyronitrile as a polymerization initiator and 0.9 part by weight of 2,2,6,6-tetramethyl-1-piperidinyloxy as a radical scavenger to obtain a mixture having a uniform composition. 12 g of the resulting mixture was sealed in the same vial as in Example 1, and left to stand in an oil bath at about 90° C. for 3 hours and at about 125° C. for 20 hours to a partially polymerized state. As a result, increase in viscosity was observed, and a partially polymerized mixture was obtained.

Then, the conversion of the monomer into the polymer of the resulting partially polymerized mixture was measured in the same manner as in Example 1. As a result, the conversion of the monomer into the polymer was 38 wt % for styrene, 35 wt % for n-butyl acrylate and 36 wt % as a whole.

Further, the above partially polymerized mixture was stored for about 2 weeks at low temperature (about 5° C.) or at room temperature and then analyzed in the same manner. There was no change in the conversion of the monomer into the polymer, and no progress in polymerization during this period was observed. Thus, it was demonstrated that the partially polymerized mixture was excellent in stability during storage.

Then, the partially polymerized mixture was put into a vial again and heated at about 130° C., whereupon polymerization was resumed and completed to obtain a polymer (a shaped product).

From the results of Examples 10–11, it is evident that when a process which comprises preparing a partially polymerized mixture by using a radical scavenger and a polymerization initiator and then preparing a shaped product, is used, storage stability in a partially polymerized state is excellent, and polymerization can be resumed and completed by such a simple operation as heating in that state.

According to the process for producing a shaped product of the present invention, it is possible to prepare a shaped product which has a small polymerization shrinkage and which is substantially in the same shape as desired.

Accordingly, the process for producing a shaped product of the present invention is useful for the production of three-dimensional shaped products having specific shapes including a shaped product for which a high level of dimensional precision is required, such as an ocular lens, or for the production of a curing compound which is free from voids after curing.

What is claimed is:

1. A process for producing a shaped product, which comprises polymerizing a mixture comprising a radical scavenger, a polymerization initiator and a radical polymerizable monomer to obtain a partially polymerized mixture having the conversion of the monomer into the polymer of from 5 to 90 wt %, filling the partially polymerized mixture in a predetermined cavity and then applying polymerization energy to complete polymerization.

2. The process for producing a shaped product according to claim 1, wherein the radical scavenger is at least one selected from the group consisting of a stable nitroxy radical, a carbamate compound and an iodine compound.

3. The process for producing a shaped product according to claim 1, wherein the radical scavenger is a stable nitroxy radical of the formula (I):

wherein each of $R^1$ and $R^2$ which are independent of each other, is a linear or branched $C_{1-10}$ alkyl or alkylene group, provided that when both $R^1$ and $R^2$ are alkylene groups, $R^1$ and $R^2$ are connected via an organic group.

4. The process for producing a shaped product according to claim 1, wherein the radical scavenger is a carbamate compound having a group of the formula (II):

wherein each of $R^3$ and $R^4$ which are independent of each other, is a hydrogen atom or a $C_{1-10}$ alkyl group.

5. The process for producing a shaped product according to claim 1, wherein the radical scavenger is an iodine compound.

6. The process for producing a shaped product according to claim 1, wherein the radical polymerizable monomer is a monomer containing a polymerizable unsaturated double bond selected from the group consisting of an acryloyl group, a methacryloyl group, a vinyl group and an allyl group.

7. The process for producing a shaped product according to claim 1, wherein the polymerization energy is electromagnetic radiation energy, heat energy or a combination thereof.

8. The process of claim 1, wherein said radical scavenger is at least one carbamate compound selected from the group consisting of n-butyl N,N-dimethyldithiocarbamate, benzyl dithiocarbamate, benzyl N,N-dimethyl-dithiocarbamate, benzyl N,N-diethyldithiocarbamate, thiuram monosulfide, N,N'-dimethylthiuram monosulfide, N,N,N', N'-tetramethylthiuram monosulfide, N,N'-diethylthiuram monosulfide, N,N,N', N'-tetraethylthiuram monosulfide, thiuram disulfide, N,N-dimethylthiuram disulfide, N,N,N', N'-tetramethylthiuram disulfide, N,N'-diethylthiuram disulfide, N,N'-dimethylthiuram tetrasulfide, N,N,N', N'-tetraethylthiuram disulfide, p-xylenebis (dithiocarbamate), p-xylenebis (N,N-dimethyldithiocarbamate), p-xylenebis (N,N-diethyldithiocarbamate), 1,2-bis (N,N-diethyldithiocarbamyl)ethane, 1,2-bis (N,N-dimethyldithiocarbamyl)ethane, 1,2,3-tris (N,N-dimethyldithiocarbamyl)propane, 1,2,4,5-tetrakis (N,N-diethyldithiocarbamylmethyl)benzene and 1-(N,N-diethyldithiocarbamyl)ethyl acetate.

9. The process of claim 1, wherein said radical scavenger is at least one iodine compound selected from the group consisting of iodoform, diiodomethane, iodine phenylethane, benzil iodide, iodoethane, 1,1-diiodoethane, 1,1,1-triiodoethane, 1,2-diiodoethane, 1-iodo-2-methylpropane, 2-(1-ethoxy)ethyl acetate, methyl 2-iodo-2-butanoate, ethyl 2-iodo-2-butanoate, methyl 2-iodopropionate, ethyl 2-iodopropionate, 4-iodotoluene, 3-iodotoluene, 2-iodoethyl acetate and 2-iodoethyl propionate.

10. The process of claim 1, wherein said polymerization initiator is selected from the group consisting of a peroxide, an azo compound, a redox initiator and a photoinitiator.

11. The process of claim 10, wherein said peroxide is selected from the group consisting of benzoyl peroxide, acetyl peroxide, lauroyl peroxide, potassium peroxydisulfate, ammonium peroxydisulfate, cumene hydroperoxide, t-butyl hydroperoxide, dicumyl peroxide and di-t-butyl peroxide.

12. The process of claim 10, wherein said azo compound is selected from the group consisting of azobisisobutyronitrile, azobis-2,4-dimethylvaleronitrile, azobiscyclohexanecarbonitrile and azobis-2-amidinopropane hydrochloride.

13. The process of claim 10, wherein said redox initiator is selected from the group consisting of potassium peroxydisulfate-sodium sulfite and ammonium peroxydisulfate-sodium sulfate.

14. The process of claim 10, wherein said photoinitiator is selected from the group consisting of benzophenone, acetophenone, trichloroacetophenone, methylbenzoyl formate and 2-hydroxy-2-methyl-1-phenylpropane-1-one.

15. The process of claim 6, wherein said monomer is selected from the group consisting of an alkyl (meth)acrylate, a fluoroalkyl (meth)acrylate, a silicon-containing (meth)acrylate, a hydroxyalkyl (meth)acrylate, a (meth)acrylamide, styrene, an alkylstyrene, a fluoroalkylstyrene, a silicon-containing styrene, vinyl acetate, (meth)acrylonitrile, (meth)acrylic acid, α-methylstyrene, and N-vinylpyrrolidone.

16. The process of claim 15, wherein said alkyl (meth)acrylate is selected from the group consisting of methyl (meth)acrylate, ethyl (meth)acrylate, propyl (meth)acrylate and butyl (meth)acrylate; said fluoroalkyl (meth)acrylate is selected from the group consisting of trifluoroethyl (meth)acrylate, tetrafluoropropyl (meth)acrylate, hexafluoroisopropyl (meth)acrylate and octafluoropentyl (meth)acrylate; said silicon-containing (meth)acrylate is selected from the group consisting of trimethylsilylpropyl (meth)acrylate and tris(trimethylsiloxy)silylpropyl (meth)acrylate; said hydroxyalkyl (meth)acrylate is selected from the group consisting of 2-hydroxyethyl (meth)acrylate and 2-hydroxybutyl (meth)acrylate; said (meth)acrylamide is selected from the group consisting of (meth)acrylamide, N,N-dimethyl(meth)acrylamide and N,N-diethyl(meth)acrylamide; said alkylstyrene is selected from the group consisting of o-methylstyrene, m-methylstyrene, p-methylstyrene, o-ethylstyrene, m-ethylstyrene, p-ethylstyrene, o-octylstyrene, m-octylstyrene and p-octylstyrene; said fluoroalkylstyrene is selected from the group consisting of o-trifluoromethylstyrene, m-trifluoromethylstyrene and p-trifluoromethylstyrene; said silicon-containing styrene is selected from the group consisting of o-trimethylsilylstyrene, m-trimethylsilylstyrene, p-trimethylsilylstyrene, o-tris(trimethylsiloxy)silylstyrene, m-tris(trimethylsiloxy)silylstyrene and p-tris(trimethylsiloxy)silylstyrene.

17. The process of claim 3, wherein said $R^1$ and $R^2$ are alkylene groups and said organic group has a substituent selected from the group consisting of a hydroxyl group, a cyano group, an amino group, a group having an ester bond, a carbonyl group and a group containing an aromatic substitution product.

18. The process of claim 17, wherein said organic group is selected from the group consisting of 1,1,4,4-tetramethylbutylene group, 1,1,5,5-tetramethylpentylene group and 1,1,6,6-tetramethylhexylene group.

19. The process of claim 3, wherein said nitroxy radical of formula (I) is at least one radical selected from the group consisting of 2,2,6,6-tetramethyl-1-piperidinyloxy, 4-amino-2,2,6,6-tetramethyl-1-piperidinyloxy, 4-acetamide-2,2,6,6-tetramethyl-1-piperidinyloxy, 4-phosphonooxy-2,2,6,6-tetramethyl-1-piperidinyloxy, 4-carboxy-2,2,6,6-tetramethyl-1-piperidinyloxy, 4-cyano-2,2,6,6-tetramethyl-1-piperidinyloxy, 4-hydroxy-2,2,6,6-tetramethyl-1-piperidinyloxy, 3-aminoethyl-2,2,5,5-tetramethyl-1-pyrrolidinyloxy, 3-carbamoyl-2,2,5,5-tetramethyl-1-pyrrolidinyloxy, 3-carboxy-2,2,5,5-tetramethyl-1-pyrrolidinyloxy, 3-cyano-2,2,5,5-tetramethyl-1-pyrrolidinyloxy, 3-maleimido-2,2,5,5-tetramethyl-1-pyrrolidinyloxy, 3-(4-nitrophenoxycarbonyl)-2,2,5,5-tetramethyl-1-pyrrolidinyloxy, 3,3-dimethyl-1-oxa-4-azaspiro[4.5]dec-4-yloxy, 2-butyl-4,4-dimethyl-2-pentyl-3-oxazolidinyloxy, 4,4-dimethyl-2,2-dinonyl-3-oxazolidinyloxy, 4-phenacylidene-2,2,5,5-tetramethylimidazolidin-1-yloxy, 4-acetyl-2,2,6,6-tetramethyl-piperazinyloxy, 2,2,5,5-tetramethyl-3-carbamido-3-pyrroline-1-oxyl, N,N-di-t-butylaminoxyl, N,N-di-(1,1-dimethylethyl)aminoxyl, 2,2,7,7-tetramethyl-1-homopiperidinyloxy, 4-amino-2,2,7,7-tetramethyl-1-homopiperidinyloxy, 4-acetamido-2,2,7,7-tetramethyl-1-homopiperidinyloxy, 4-phosphonooxy-2,2,7,7-tetramethyl-1-homopiperidinyloxy, 4-carboxy-2,2,7,7-tetramethyl-1-homopiperidinyloxy, 4-cyano-2,2,7,7-tetramethyl-1-homopiperidinyloxy, 4-hydroxy-2,2,7,7-tetramethyl-1-homopiperidinyloxy, 4-maleimide-2,2,7,7-tetramethyl-1-homopiperidinyloxy, and 4-(4-nitrobenzoyloxy)-2,2,7,7-tetramethyl-1-homopiperidinyloxy.

\* \* \* \* \*